United States Patent [19]

Grassmann

[11] 4,292,641

[45] Sep. 29, 1981

[54] ELECTRICALLY HEATED RECORDING INDICATOR FOR RECORDING INSTRUMENTS AND THE LIKE

[76] Inventor: Josef Grassmann, Cäcilienstrasse 4, D-5202 Hennef 1, Fed. Rep. of Germany

[21] Appl. No.: 133,075

[22] Filed: Mar. 24, 1980

[30] Foreign Application Priority Data

Mar. 24, 1979 [DE] Fed. Rep. of Germany ... 7908387[U]

[51] Int. Cl.³ ............................................ G01D 15/10
[52] U.S. Cl. ................................ 346/76 R; 346/139 C
[58] Field of Search ............ 346/76 R, 76 PH, 139 C; 219/216, 237

[56] References Cited

U.S. PATENT DOCUMENTS

| | | | |
|---|---|---|---|
| 3,811,030 | 5/1974 | Veach | 346/139 C UX |
| 3,814,897 | 5/1974 | Otani et al. | 219/216 |
| 4,168,505 | 9/1979 | Gaskill, Jr. et al. | 346/139 C |
| 4,216,478 | 8/1980 | Giedd et al. | 346/76 PH X |

FOREIGN PATENT DOCUMENTS

| | | | |
|---|---|---|---|
| 1276353 | 8/1968 | Fed. Rep. of Germany | ... 346/139 C |
| 1114661 | 5/1968 | United Kingdom | ............ 346/139 C |

*Primary Examiner*—George H. Miller, Jr.
*Attorney, Agent, or Firm*—John C. Smith, Jr.

[57] ABSTRACT

An electrically heated recording indicator is designed for use in a recording instrument or the like utilizing a thermosensitive recording medium. The recording indicator comprises an outer electrically conductive metallic tubular support member and an inner electrically insulating non-metallic tubular member positioned in the outer tubular support member. The outer tubular support member has an aperture adjacent one end thereof and the inner tubular member is arranged to extend across the aperture. Electrical resistance heating means is located within the inner tubular member. The heated inner tubular member directly contacts the thermosensitive recording medium through the aperture in the outer tubular support member to write on the thermosensitive recording medium.

9 Claims, 2 Drawing Figures

ELECTRICALLY HEATED RECORDING INDICATOR FOR RECORDING INSTRUMENTS AND THE LIKE

BACKGROUND OF THE INVENTION

This invention relates to an electrically heated recording indicator for use in a recording instrument utilizing a thermosensitive recording medium.

In a recording indicator the heated writing tube is designed to be placed during the writing operation in direct contact with the surface of the thermosensitive recording medium, e.g. recording paper. T..e writing tube is normally composed of either metal or a ceramic. A disadvantage of metallic writing tubes is that they are generally subject to a relatively high rate of wear. In addition, the time required to heat a metallic writing tube is relatively long. When a metallic writing tube is used, the quality of the writing, particularly in the case of high-speed recording, is often of poor quality because the heat from an electrically heated coil located in the writing tube is transmitted via an insulating pipe of poor heat conductivity or via air to the writing tube. Due to its relatively good thermal conductivity, a metallic writing tube dissipates heat from its source at a high rate so that insufficient heat is transferred to the thermosensitive recording medium during writing.

In the case of a ceramic writing tube, heat is transmitted from an electrical heating source via air to the writing tube which is in direct contact with the thermosensitive recording medium. An electrically conductive bear extending along the ceramic tube is fixed to one end of the ceramic tube, the other end being connected electrically with one end of the heating coil. A disadvantage of this arrangement is the high specific gravity and the high air resistance, both of which tend to retard fast movement of the ceramic writing tube. Furthermore, the ceramic writing tube is subject to mechanical damage.

The weight of a recording indicator should be as low as possible; and its mass, inertia and air resistance should also be low to assure accurate recording. Moreover, the intrinsic resonance of the recording indicator should be in a frequency range above the highest frequency to be recorded so as to avoid recording errors.

An object of the present invention is to provide a recording indicator of the type described which avoids the abovementioned disadvantages and provides excellent writing quality, durability and accuracy.

SUMMARY OF THE INVENTION

In accordance with the present invention, the recording indicator comprises an outer tubular support member having an aperture therein located adjacent one end thereof constituting the writing area and an inner non-metallic tubular member positioned in the outer tubular support member, the inner tubular member extending across the aperture in the outer tubular support member. Electrical means is positioned within the inner tubular member for heating the inner tubular member. The heated inner tubular member, which constitutes the writing tube, may directly contact the thermosensitive recording medium through the aperture in the outer tubular support member to write on the recording medium.

Preferably, an electrical resistance heating coil is housed inside the inner non-metallic tubular member where it is positioned against the internal wall of the inner non-metallic tubular member. Thus, there is a direct heat transfer to the inner non-metallic tubular member insuring adequate heat transfer therefrom to the thermosensitive recording medium.

Also, preferably, the inner non-metallic tubular member is shorter than the outer tubular support member and is housed only in the writing area adjacent one end thereof. It should be insulated at both ends and about the periphery by means of a heat-resistant insulating substance such that the inner tubular member is sealed against atmospheric conditions.

The heating element contained within the inner non-metallic tubular member may be an electrical resistance coil or a thin-walled electrically conductive tube. One end of the heating element may be connected to the outer metallic tubular support member and the other end connected to an insulated wire extending through the outer tubular support member to the heating element.

BRIEF DESCRIPTION OF THE DRAWINGS

Reference is made to the accompanying drawings, which illustrate an embodiment of the present invention wherein.

DETAILED DESCRIPTION OF THE INVENTION

Figure 1:
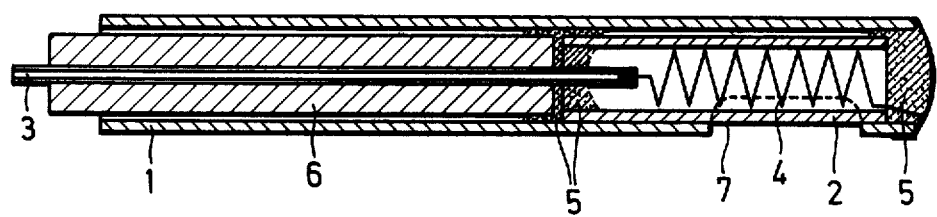
FIG. 1 is a cross-sectional view of the electrically heated recording indicator.
Figure 2:
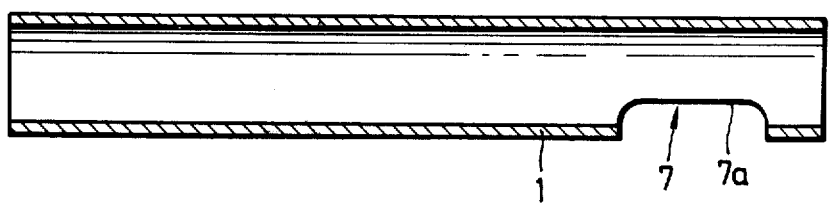
FIG. 2 is a cross-sectional view of the outer tubular support member of the recording indicator.

The electrically heated recording indicator includes a single-piece outer tubular support member 1 in which an inner non-metallic tubular member 2 is positioned. Preferably, the inner non-metallic tubular member 2 is substantially shorter than the outer tubular support member 1 and is located in the vicinity of one end thereof which constitutes the writing end of the recording indicator. An aperture 7 is provided in the writing end of the outer tubular support member 1 exposing a portion of the inner tubular member 2 and permitting the inner tubular member 2 to be brought into direct contact with a thermosensitive recording medium, e.g. a recordin paper or the like.

The inner non-metallic tubular member 2 is made of an electrically insulating material such as ceramic, glass or alumina. Preferably, a drawn ceramic tube having a smooth surface should be used to insure a clean line tracing. The outer tubular support member 1 is made of an electrically conductive material such as stainless steel, aluminum alloy, titanium or titanium alloy. With the above-described arrangement, the inner non-metallic tubular member 2 is protected against mechanical damage over its entire length by the outer tubular support member 1 except for the exposed area at the aperture 7 in the outer tubular support member.

An electrical resistance heating coil 4 is located within the inner non-metallic tubular member 2. One end of the coil is connected to an insulated wire 3 supported in an annular carrier body 6 in the outer tubular support member 1. The other end of the heating coil 4 is connected to the end of the outer tubular support member, e.g. by soldering, to complete the electrical circuit. The heating coil 4 is preferably arranged and wound such as to be located adjacent the internal wall of the inner non-metallic tubular member 2 to assure direct heat transfer from the heating coil 4 to the inner non-metallic tubular member 2.

Opposite ends of the inner non-metallic tubular member 2 are sealed against atmospheric conditions by means of a heat-resistant material 5, e.g. an adhesive. The insulating material also serves to secure the inner non-metallic tubular member 2 in place in the outer tubular support member 1. The two tubular members may be arranged to minimize heat transfer from the inner non-metallic tubular member 2 to the outer tubular support member 1. Thus, the inner non-metallic tubular member 2 may be located concentrically with respect to the outer tubular support member 1 so that the inner non-metallic tubular member 2 is fully insulated by the surrounding insulating material 5 with respect to the outer tubular support member 1. Alternatively, the inner non-metallic tubular member 2 may be disposed eccentrically with respect to the outer tubular support member 1 such that the inner tubular member 2 is as close as possible to the outer periphery of the outer tubular support member 1. In this embodiment there is a single line contact between the two tubular members at opposite ends of the aperture 7 in the outer tubular support member 1.

The aperture 7 in the outer tubular support member 1 is preferably as small as possible and preferably should not extend in the circumferential direction more than half the circumference of the outer tubular support member 1. However, the aperture 7 must extend in the circumferential direction a sufficient distance to prevent contact of the longitudinal edges 7a thereof with the thermosensitive recording medium.

The recording indicator described above offers substantial advantages. The high rate of wear normally associated with prior art recording indicators is substantially reduced due to the composition of the inner non-metallic tubular member 2. Thus, the writing quality of the recording indicator is maintained clean and at a constant writing width for an extended period of use. Furthermore, the time required to heat the inner non-metallic tubular member is substantially less than that for a metallic tube since the rate of heat dissipation is substantially less for such materials as ceramic, glass and alumina. The inner non-metallic tubular member 2, though composed of a composition which is considered fragile, is adequately protected from mechanical damage over its entire length by the outer metallic tubular member 1. Thus, the recording indicator of the present invention is strong, durable and permits precise fine-line tracing.

I claim:

1. An electrically heated recording indicator for use in a recording instrument utilizing a thermosensitive recording medium, comprising:
   (a) an outer tubular support member having an aperture therein located in the vicinity of one end thereof constituting the writing area;
   (b) an inner non-metallic tubular member positioned in said outer tubular support member, said inner tubular member extending across said aperture in said outer tubular support member; and
   (c) electrical means for heating said inner tubular member;
   (d) whereby said heated inner tubular member may directly contact said thermosensitive recording medium through said aperture in said tubular support member to write on said recording medium.

2. An electrically heated recording indicator according to claim 1 wherein said inner tubular member extends within only a portion of said outer tubular member adjacent said one end thereof.

3. An electrically heated recording indicator according to claim 1 further comprising insulating means at opposite ends of said inner tubular member and between said inner and outer tubular members to resist transmission of heat between said inner and outer tubular members and seal said inner tubular member against atmospheric conditions.

4. An electrically heated recording indicator according to claim 1 wherein said outer tubular support member is composed of a material selected from the group consisting of stainless steel, aluminum alloy, titanium and titanium alloy.

5. An electrically heated recording indicator according to claim 1 wherein said heating means comprises a thin-walled electrically conductive tube contained within said inner tubular member.

6. An electrically heated recording indicator according to claim 1 wherein said heating means comprises an electrically heated coil within said inner tubular member.

7. An electrically heated recording indicator according to claim 6 wherein said outer tubular member is electrically conductive, said recording indicator comprising an electrical conductor connected to one end of said heating coil, the opposite end of said heating coil being connected to said outer tubular member.

8. An electrically heated recording indicator according to claim 1 wherein said inner tubular member is composed of an electrically insulating material.

9. An electrically heated recording indicator according to claim 8 wherein said electrically insulating material of said inner tubular member is selected from the group consisting of ceramic, glass and alumina.

* * * * *